United States Patent [19]

Crosas

[11] 4,232,758
[45] Nov. 11, 1980

[54] ELECTROMECHANICAL ANTI-THEFT SYSTEM FOR AUTOMOBILE VEHICLE

[76] Inventor: Pedro B. Crosas, Calle Agudas No, 32, Gerona, Spain

[21] Appl. No.: 900,502

[22] Filed: Apr. 27, 1978

[30] Foreign Application Priority Data

May 4, 1977 [ES] Spain .................................. 459146

[51] Int. Cl.² ............................................ B60R 25/08
[52] U.S. Cl. ..................................... 180/287; 70/243; 70/278; 70/313; 307/10 AT
[58] Field of Search ................... 180/287; 307/10 AT; 70/278, 313, 242, 243

[56] References Cited

U.S. PATENT DOCUMENTS

| | | |
|---|---|---|
| 3,174,502 | 3/1965 | Howarth .......................... 307/10 AT |
| 3,544,804 | 12/1970 | Gaumer .......................... 307/10 AT |
| 3,756,341 | 9/1973 | Tonkowich .......................... 180/114 |
| 3,818,436 | 6/1974 | Hong .............................. 180/114 X |

Primary Examiner—John P. Silverstrim
Attorney, Agent, or Firm—O'Brien & Marks

[57] ABSTRACT

Electrovalves are opened in automobile piping of a brake line, a clutch line and a fuel line by a current through normally open contacts of a plurality of control relays and through normally closed contacts of an interlocking relay. The control relays are operated by selected switches of a plurality of push-button switches while the interlocking relay is operated by the non-selected switches of the plurality of switches. The control relays are interconnected so that the selected push-button switches must be operated in a selected sequence. All the relays have holding circuits.

3 Claims, 1 Drawing Figure

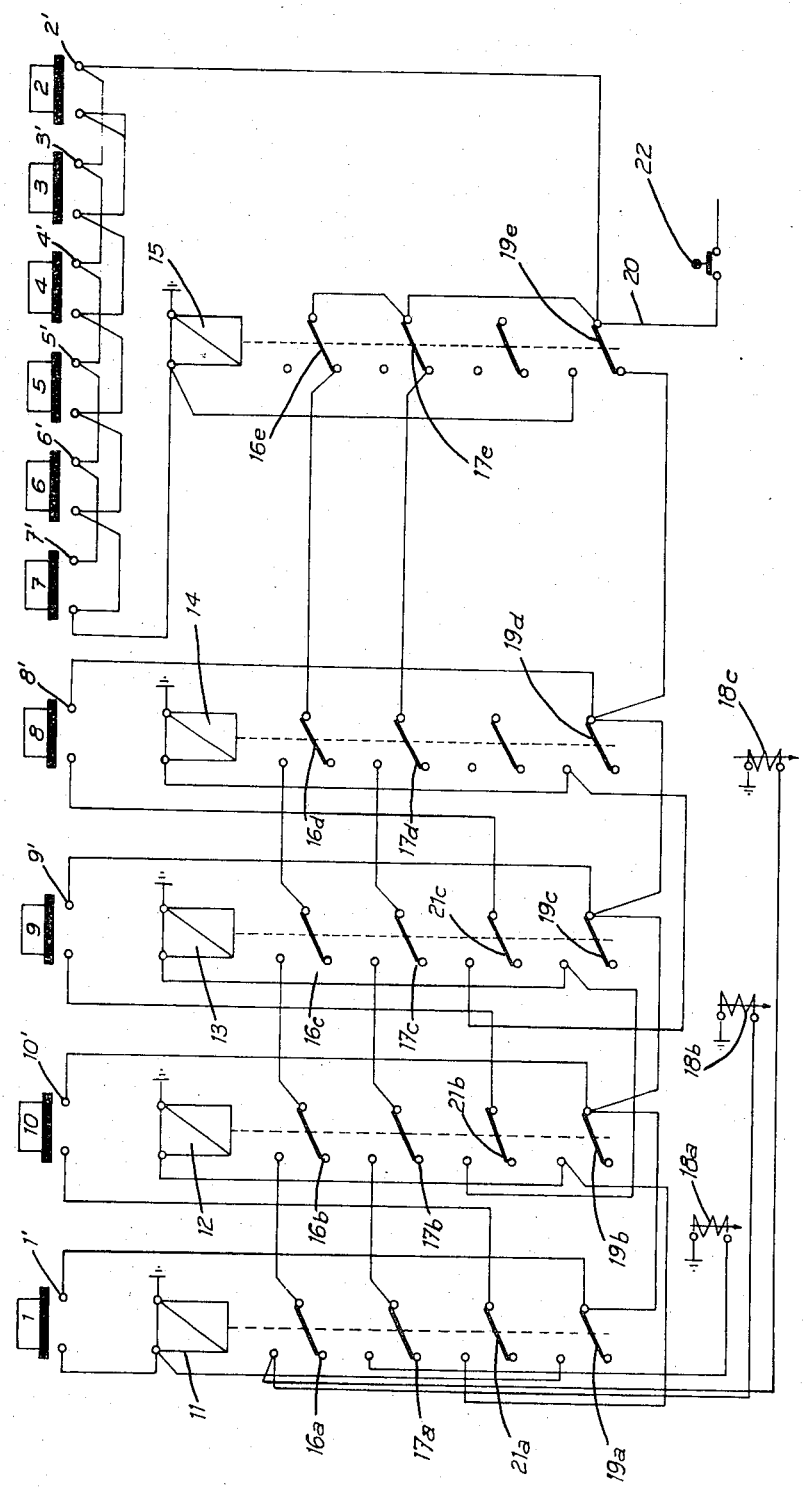

ELECTROMECHANICAL ANTI-THEFT SYSTEM FOR AUTOMOBILE VEHICLE

The present invention refers to an electromechanical system, the purpose of which is the obstruction of fluid piping, specifically designed to be used as an anti-theft system for automobile vehicles. Its principal characteristics are intended to produce obstructions in the pipes of the vehicle corresponding to the brake liquid, the clutch and the gasoline, gas or gas oil feed, so that when the vehicle is at rest its fuel feed is interrupted, its wheels are braked, and its clutch is released.

In order that the above-mentioned pipes may remain open and the vehicle may function normally, the system under reference makes it necessary to operate a given number of push-buttons situated on a panel. Only some of these push-buttons have an operational function, and moreover they must be pressed in a given order. Because of these conditions, the pressing of the operational push-buttons in an order other than that predetermined will not permit the unblocking of the pipes referred to above, while the pressing of any one of the rest of the push-buttons will produce the interlocking and blocking of the whole set of push-buttons, with the result that it will be useless to continue attempts to seek for the correct code.

For this purpose a unidirectional solenoidal electrovalve is placed in each of the pipes mentioned above, which valve is normally in the closed position. These electrovalves are fed by means of the contacts of a series of relays which count with means of self-feeding once the push-buttons corresponding to them have been pressed, provided that they are pressed in accordance with a pre-established sequence. These control relays are fed by means of one of the contacts of an interlocking relay so that, on the interlocking relay being operated, the feed to the control relays is automatically cut off. This interlocking electromechanical relay comes into play preciesly at the moment when one of the push-buttons that have not been included in the code is operated.

From what has been stated above it may be deduced that, since in order to operate the electrovalves it is necessary to operate progressively and in a determined sequence the push-buttons that correspond to the electromagnetic control relays, and it is likewise necessary not to operate the push-buttons not included in the code, the possibilities of causing the electrovalves to open, without knowing the code in question, are practically non-existent.

In order to complement the description that follows, and to facilitate a better understanding of the characteristics of the invention, there is annexed to this specification, as an integral part thereof, a single sheet of drawings in which, with an illustrative but not limitative character, there is represented in diagrammatic form a circuit that corresponds to an example of embodiment of the electromechanical obstruction of fluid piping which constitutes the subject of this invention.

In the said example of embodiment provision has been made for the utilization of ten push-buttons, four electromagnetic control relays, and one interlocking electromagnetic relay, together with three electrovalves. It is obvious that the number of these elements may be varied, with the exception of the interlocking electromagnetic relay, which in all cases will be included as a single element. In this context, the number both of the control relays and of the push-buttons may be increased or reduced at will. The group of push-buttons may be numbered from one to ten, and they may be marked by the twenty-six letters of the alphabet up to a maximum number of 36 push-buttons. Thus the different combinations that may be established by varying the connections of the push-buttons in question amount to the value of factorial 36. Taking into account such an enormous number of possibilities, it is obvious that the identification of the code will prove to be practically impossible. The number of electrovalves may also be varied as has been said above, according as to whether it is intended to produce an obstruction in only one of the elements of the vehicle, which have been referred to above, in two of them, or in all three.

Again, one of these electrovalves may be substituted by a relay, the function of which is the connection and disconnection of the feed circuit of the coil, or of any other appropriate point in the electrical circuit of the vehicle.

With further reference to the example of embodiment selected, it should be stated that it is fitted with ten push-buttons bearing the reference numbers from 1 to 10. Each of them is equipped with a micro-switch ($1'$ to $10'$). The push-buttons $1'$, $10'$, $9'$ and $8'$ are intended to act on the corresponding electromagnetic control relays 11, 12, 13 and 14, while the rest of the push-buttons, that is to say the push-buttons $7'$, $6'$, $5'$, $4'$, $3'$ and $2'$ are not included in the code, and, being appropriately assembled in parallel, they all act on the electromechanical interlocking relay 15.

All these electromechanical relays, both the control relays, 11, 12, 13 and 14, and the interlocking relay 15 have four contacts. Two of them ($16a$–$16d$ and $17a$–$17d$) are intended to feed the electrovalves $18a$–$18c$, so that the electrovalves 18 receive current from the relay 11 when the latter is activated: in turn, the relay 11 receives current by means of the contacts $16_b$ and $17_b$ of the relay 12; the latter receives current through the contacts $16_c$ and $17_c$ of the relay 13, while the latter receives current through the contacts $16_d$ and $17_d$ of the relay 14. This latter control relay receives current from the interlocking relay 15, by means of its two contacts 16e and 17e. A characteristic to be noted is that the connection of the contacts of the last-named relay 15 is effected when the said relay is deactivated, contrary to that which occurs in the case of the relays 11, 12, 13 and 14.

Thus, in order that the feed current may reach the electrovalves 18, it is necessary for the electromechanical interlocking relay 15 to be deactivated, and for the control relays 11, 12, 13 and 14 to be activated.

Another of the contacts ($19_a$–$19_d$) of each of the control relays 11, 12, 13 and 14 is intended for the feedback of the relays themselves once the effect of the corresponding push-buttons 1, 10, 9 and 8 has ceased to operate. For this purpose the contacts 19 are connected to the general feed 20 through the contact $19_e$ of the interlocking relay when the latter is at rest, so that on pressing the push-buttons 1 the contact $19_a$ connects the feed to the relay 11, which remains permanently activated, while the feed of the second relay, 12, is effected through the contact $21_a$ of the relay 11. so that while the said relay 11 is not activated it is impossible to feed the following relay 12. The same situation occurs with the following relay 13, which is fed through the contact $21_b$ which corresponds to the previous relay 12, so that unless the said relay 12 is activated the feeding and subsequent self-feeding of the relay 13 is impossible. Exactly the same situation occurs with respect to the relay 14, which is fed through the contact $21_c$ of the relay 13.

Thus, in order to cause the elctrovalves 18 to open, it is essential to operate the push-buttons 1, 10, 9 and 8, precisely in this order, which is that which has been preestablished, while if any of the other push-buttons (7, 6, 5, 4, 3, and 2) not included in the code is operated, the electromagnetic interlocking relay 15 is brought into operation. This leads to the opening of its contact $19_e$, and consequently to the cut-off of the feed of the electromagnetic control relays, with the result that all of them which are activated at the moment of operating any of the push-buttons not included in the code fall automatically and return to the position of rest. Thus the anti-theft system is blocked since the interlocking relay 15 continues to be self-fed through the contact $19_e$, cutting off indefinitely the feed of the control relays.

In order to be able to recommence the operation of opening the electrovalves 18, it is necessary to operate the contact switch 22, with the result that, on cutting off the general feed, the interlocking relay 15 again falls, and the possibility of feeding the control relays 11, 12, 13 and 14 is re-established. These relays are now in perfect condition to transmit the pulses corresponding to the code, in accordance with the pre-established sequence, in order to provide the feed for the said relays 11 to 14.

From what has been expounded above, it may be deduced that any of the conventional manipulations, such as the insertion of bridges, disconnection of the battery, etc., will be ineffective, since, in order to start the vehicle, it is essential to have exact knowledge of the code programmed.

The materials, form, size and arrangement of the elements mentioned in this specification may be varied, provided that such variation does not represent any alteration of the essence of the invention.

The terms employed in the drafting of this specification should always be interpreted in the broadest possible sense, and should not be considered to be limitative.

I claim:

1. An electromechanical anti-theft system for an automobile vehicle having piping forming a brake line, a clutch line and a fuel line, the system comprising
    three unidirectional solenoidal electrovalves for being situated in the piping of the brake line, the clutch line and the fuel line of the automobile vehicle, respectively;
    a plurality of first control electromechanical relays each having a relay, each control relay except for a last control relay of said plurality of control relays winding and at least three normally open contact switches ;
    a second control relay having a winding and at least two normally open contact switches;
    an interlocking electromechanical relay having a relay winding, at least two normally closed contact switch means, and one normally open contact switch means;
    means for connecting the system to an electrical power source;
    series circuit means connected with the three electrovalves across the power source connecting means;
    said series circuit means including at least one of said normally open contact switches of each of the first and second control relays and one of said normally closed contact switch means of the interlocking relay;
    a second of said normally open contact switches of each of said first and second control relays connected in a respective series holding circuit including the corresponding relay winding and the second normally closed contact switch means of the interlocking relay across the power source connecting means;
    said normally open contact switch means of the interlocking relay connected in series with the relay winding of the interlocking relay across the power source connecting means;
    a plurality of first normally open push button switches corresponding to the plurality of control relays;
    one of said first push button switches connected in a series circuit including the relay winding of the corresponding relay, and the second normally closed contact switch means of the interlocking relay across the power source connecting means;
    each of the other first push button switches connected in a respective series operating circuit including the corresponding relay winding, the third normally open contact switch of the respective preceding first control relay, and the second normally closed contact switch means of the interlocking relay across the power source connecting means; and
    a plurality of second normally open push button switches all connected in parallel with each other and in series with the relay winding of the interlocking relay across the power source connecting means.

2. A system as claimed in claim 1 wherein
    the plurality of first and second control relays comprise first, second, third and fourth control relays;
    the normally open contact switches of each of the first, second and third control relays comprise four normally open contact switches;
    the normally open contact switches of the fourth control relay comprise three normally open contact switches;
    the normally closed contact switch means of the interlocking relay comprise three normally closed contact switch means;
    the series circuit means includes first and second series circuits connected with the three electrovalves across the power source connecting means;
    said first series circuit including said one normally open contact of each of the first, second, third and fourth control relays, and said one normally closed contact switch means of the interlocking relay connected with at least one of said three electrovalves across the power source connecting means; and
    said second series circuit including the fourth normally open contact switch of each of the first, second, third and fourth control relays, and the third normally closed contact switch means of the interlocking relay connected with at least another of said three electrovalves across the power source connecting means.

3. A system as claimed in claim 1 or 2 including
    a normally closed switch in series with the power source connecting means for resetting the relays.

* * * * *